United States Patent Office 3,361,751
Patented Jan. 2, 1968

3,361,751
BENZOCYCLOHEPTABENZOQUINOLIZINES
Leslie G. Humber, Dollard des Ormeaux, Quebec, and Martin A. Davis, Montreal, Quebec, Canada, assignors to American Home Products Corporation, New York, N.Y., a corporation of Delaware
No Drawing. Filed Nov. 30, 1965, Ser. No. 510,678
1 Claim. (Cl. 260—289)

This invention relates to new compounds containing a certain novel pentacyclic ring system, viz, the 1,2,3,4,6,6a,11,12 - octahydro - 15b,H-benzo[4,5]cyclohepta[1,2,3-g,h]benzo[a]quinolizine ring system. These compounds may be represented generically by Formula I,

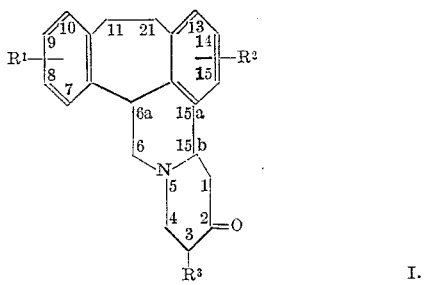

in which $R^1$, $R^2$, and $R^3$ may be hydrogen, or, alternatively $R^3$ may be a lower alkyl group containing from one to six carbon atoms, and, $R^1$ and $R^2$ may represent one or more substituents on an aromatic ring, such substituents including lower alkyl, halogen, hydroxyl, lower alkoxy, lower alkylthio, and trihalomethyl.

This invention also relates to a process for the preparation of the pharmacologically active compounds described herein. Thus, the compounds of Formula I are prepared from the appropriately substituted 3,8,9-trihydro-3a,H-benzo[6,7]cyclohepta[1,2,3 - d,e]isoquinoline hydrochloride II, where $R^1$ and $R^2$ have the meaning described above.

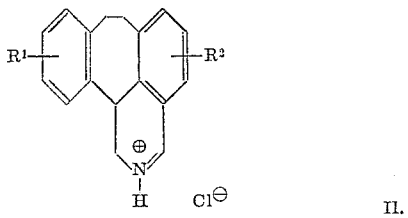

The process for preparing the intermediates II, above, have been described in detail in our co-pending application, S.N. 484,440, filed Sept. 1, 1965. The process for preparing the novel compounds of this application, consists in the reaction of II with a methyl vinyl ketone derivative of Formula III

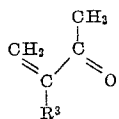

wherein $R^3$ has the same meaning as in Formula I above, in a suitable solvent such as, for example, methanol, ethanol, or isopropanol. A crystalline quaternary Schiff's base derivative of Formula IV is obtained by this step, and this compound

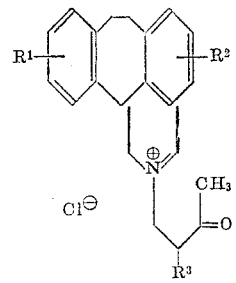

is subsequently cyclized by dissolving in an aqueous medium and reacting with a basic reagent such as an alkali metal carbonate or hydroxide. The final products, I, are isolated by conventional extraction with a water immiscible solvent such as, for example, benzene or chloroform, and evaporation of the latter.

The compounds of this invention of Formula I possess useful pharmacological properties as trichomonicidal agents. Thus they are active against *T. vaginalis* and for this purpose the compounds of Formula I may be formulated, either as the free base or as a salt with a pharmacologically acceptable acid, as solutions, creams, lotions, or vaginal inserts with pharmacologically acceptable vehicles containing from 0.1 to 1.0 percent of the active ingredient.

The compounds of this invention also possess central nervous system regulatory activity.

The following examples will illustrate our invention.

EXAMPLE 1

2 - oxo - 1,2,3,4,6,6a,11,12 - octahydro-15b,H-benzo[4,5]-cyclohepta[1,2,3-g,h]benzo[a]quinolizine 3,8,9 - trihydro - 3a,H-benzo[6,7]cyclohepta[1,2,3-d,e]-isoquinoline hydrochloride (28.0 gm.) is dissolved in absolute ethanol (300 ml.) and cooled to 15°. Freshly distilled methyl vinyl ketone (83 ml.) is added, the mixture refluxed for 6 hrs. then allowed to remain at room temperature for 15 hrs. Concentration of the reaction mixture yields crystals with a melting range of 185–206° C. They are dissolved in 500 ml. of 5% ethanol in water with heating, a few drops of 15% aqueous hydrochloric acid are added, the solution is filtered, cooled and made alkaline with 5% aqueous sodium carbonate. The resulting solution is extracted with chloroform to yield an oil. Crystallization from acetonitrile gives the title compound as a mixture of 15b-α and 15b-β derivatives, recrystallized from absolute ethanol to M.P. 162–164° C. Its composition is confirmed by elementary analysis.

We claim:

1. 2-oxo-1,2,3,4,6,6a,11,12-octahydro - 15b,H - benzo-[4,5]cyclohepta[1,2,3-g,h]benzo[a]quinolizine.

References Cited
UNITED STATES PATENTS 3,258,488    6/1966    Judd et al. _____ 260—283 X

OTHER REFERENCES

Van der Stelt et al., Receveil des Travaux Parp-Bas. vol. 85, pp. 1466–70 (1965).

ALEX MAZEL, *Primary Examiner.*

D. G. DAUS, *Assistant Examiner.*